July 27, 1954
C. H. O. BERG
2,684,868
CONVEYANCE OF GRANULAR SOLIDS
Filed Jan. 16, 1951
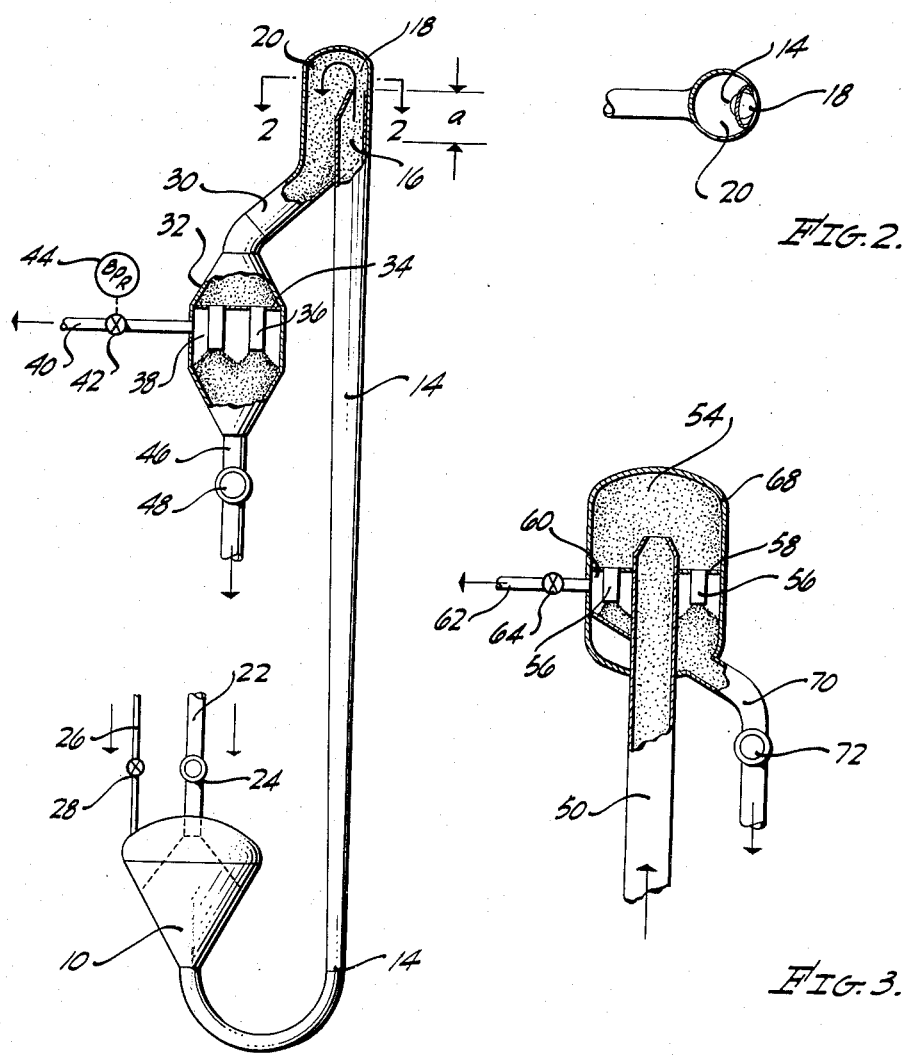
INVENTOR.
CLYDE H. O. BERG,
BY
AGENT.

Patented July 27, 1954

2,684,868

UNITED STATES PATENT OFFICE 2,684,868

CONVEYANCE OF GRANULAR SOLIDS

Clyde H. O. Berg, Long Beach, Calif., assignor to Union Oil Company of California, Los Angeles, Calif., a corporation of California Application January 16, 1951, Serial No. 206,170

11 Claims. (Cl. 302—17)

This invention relates to the conveyance of granular solids and in particular to the movement of continuous masses of substantially compact solids through conduits by means of a cocurrently depressuring conveyance fluid. Specifically the present invention relates to an improved method and apparatus for removing the granular solids from the conveyance conduit or zone which maintains their substantially compact form while in transit through the conveyor.

The movement of granular solids in appreciably large quantities presents a technical problem in many industrial operations such as the movement of cracking catalysts in the well known T. C. C. and fluid cracking processes, the conveyance of sand from tar sand retorting processes, the movement of ores and coal in metallurgical operations, and in many other industrial processes in which large quantities of granular solids are employed. Problems are encountered particularly when granular solids must be transported continuously at high volumetric flow rates, or under pressure, or under conditions where losses of the solids due to attrition or abrasion must be minimized. Such conditions are pronounced in the transportation of expensive granular catalysts which are required to be circulated at rates of as high as 800 to 1,000 tons per hour as, for example, in catalytic cracking processes employing high catalyst-to-oil ratios.

Conventionally granular solids are conveyed by moving mechanical equipment such as bucket elevators, the various forms of belt conveyors and other apparatus such as open or enclosed drag lines. For atmospheric pressure operations such mechanical equipment adequately serves to transport the granular solids at moderate rates. However, when the solids are desirably transported at high flow rates, or in connection with processes in which fluids under pressure contact the granular solids, or in processes where the solids are at an elevated temperature or where the attrition loss of granular solids must be kept at a minimum, the numerous disadvantages of such mechanical conveyances present themselves. Among these problems is the size of the equipment necessary to transport large quantities of granular solids. For example, bucket elevators necessary to transport cracking catalysts at a rate of about 150 tons per hour are approximately 4 feet in length, 1 foot in width, and 1½ feet deep. Furthermore, the maintenance of the necessary driving mechanism at elevated temperatures of the order of those in the hydrocarbon cracking and other contact processes is difficult and expensive. Furthermore, the quantity of granular solids lost by attrition in loading and unloading the buckets is frequently excessive.

It is therefore an object of the present invention to provide an improved method for the conveyance of granular solids through relatively small sized equipment at relatively high volumetric flow rates without the disadvantages inherent in moving mechanical conveyors.

It is an additional object of this invention to provide a method for the conveyance of granular solids in which no movement of mechanical equipment is employed and the conveyance is effected by a depressuring cocurrent flow of a conveyance fluid through a conduit carrying the granular solids in substantially compact form.

It is a further object of this invention to provide an improved method for maintaining the granular solids in substantially compact form in the conveyance conduit whereby the conveyance force on the granular solids issuing from the conduit and into a closed reversing zone is increased to a value above that maintained in the line and is subsequently decreased in the reversing zone.

It is a more specific object to provide an improved means for restricting the discharge of granular solids from the conveyance conduit according to the present invention, which restrictive force is independent of the presence of granular solids surrounding the outlet of the conveyance zone.

It is also an object of this invention to provide an improved solids conveyance apparatus for the conveyance of substantially compact granular solids which is characterized by a special solids outlet providing a restrictive force on the discharging solids which is exerted immediately upon initiating solids movement in a line full of solids and does not require the presence of solids surrounding the outlet.

Other objects and advantages of the present invention will become apparent to those skilled in the art as the description thereof proceeds.

Briefly the present invention comprises the conveyance of granular solids in substantially compact form by means of a cocurrently depressuring conveyance fluid which may be liquid or gaseous. A consideration of the coefficient of expansion of the particular fluid employed is necessary in order that a constant conveyance force ratio, as defined in Equation 3 below, be maintained throughout the conveyance zone for maximum conveyance efficiency. When liquid fluids are used or gaseous fluids are employed under conditions wherein the total pressure drop through the conveyance zone is less than about 5 per cent of the absolute inlet pressure, the expansion of the conveyance fluid is generally insufficient and requires no special means provided for maintaining a constant conveyance force ratio. In the other cases when gaseous fluids are used with a pressure drop exceeding about 5 per cent of the absolute inlet pressure, the expansion of the fluid causes substantial fluid velocity changes which result in the variation of the conveyance force ratio (defined in Equation 3) within the conveyance zone.

An additional factor must be considered in the maintenance of constant force ratios which is dependent upon the contribution (upon pressure decrease) of part of the conveyance fluid filling the void spaces of the solids to that part of the conveyance fluid which is considered to be flowing through the interstices of the granular solids. Thus, not only does expansion of the flowing conveyance fluid cause changes in the conveyance fluid velocity and the force ratio but also the expansion of conveyance fluid carried in the void spaces between individual particles has a contributing effect.

In order to compensate for these and other factors it has been found that by increasing the cross-sectional area of the conveyance zone in the direction of solids flow, a constant conveyance fluid velocity and force ratio may be maintained. For flows of gaseous fluids it has been found that the taper of the conveyance zone, or the change in cross-sectional area with distance from its inlet, required to maintain a constant force ratio is correlated by the following equation:

$$\frac{A_2}{A_1} = \frac{1}{A_1}\left(\frac{aQ}{\rho_s}\right)\left(\frac{m.w.}{RT}\right)^{1-\frac{1}{n}}(P_1-P_2)\left(\frac{C}{P_2\frac{dp}{dl}}\right)^{\frac{1}{n}} + \left(\frac{P_1}{P_2}\right)^{\frac{1}{n}} \quad (1)$$

wherein $a$ is the void fraction of the bulk of the solids, no units
A cross-sectional area of conduit, square feet
C permeability constant as determined from:

$$\frac{dp}{dl} = C\rho^{n-1}V^n \quad (2)$$

wherein $\frac{dp}{dl}$ is pressure gradient, pounds per square foot per foot

P is the fluid density, pounds per cubic foot
V superficial gas velocity, feet per second
$n$ exponent; 1.0 for viscous flow and 1.85 for turbulent flow P pressure in conduit; pounds per square foot
Q solids flow rate; pounds per second
R gas constant; 1543 foot pounds per ° R per pound mol
T temperature; ° R=460+° F.
$\rho_s$ bulk density of solids; pounds per cubic foot
1 subscript, reference to inlet of conduit section considered
2 subscript, reference to outlet of conduit section considered
(Other consistent units may be substituted)

Therefore by employing the above correlation, a line for conveyance of granular solids under certain specific conditions is obtained for a constant pressure gradient, force ratio and maximum efficiency. Where the distance of conveyance and the bulk density characteristics of the solids are known, the change in pressure (which is linear) can be calculated knowing that $$\frac{\frac{dp}{dl}}{\rho_s \cos \theta} \geq 1.0, \text{ for example, } 1.1 \quad (3)$$

and $$P_1 - P_2 = L\frac{dp}{dl} \quad (4)$$

The value of $A_1$ is determinable from well known correlations of the rates of gravity flow of granular solids from orifices of various cross-sectional areas. From the required solids delivery rate the cross-sectional area $A_1$ is selected, the solids delivery rate Q is known, and the void fraction $a$, the bulk density of the solids, $\rho_s$ and the solids permeability factor C are determined from the granular solids physical characteristics. $P_2$ is the desired line outlet pressure and $P_1$ is estimated from the length of the line and from a known value of the conveyance force ratio, for example a value of 1.1 according to Equation 4. The reverse procedure is permissible, i. e. the estimation of $P_2$ from a known $P_1$. Using Equation 1 and the foregoing data, a value of $A_2$ is determined. If desired, a design may be effected by considering successive lengths of the conveyance zone or an estimation of the taper may be made by a similar calculation for the entire length of the conveyance zone.

The foregoing correlation permits the fabrication of a conveyance zone having a constant conveyance force ratio at any desired value. Although the tapered type of conveyance conduit is preferred, a plurality of serially connected cylindrial sections of increasing diameter in the direction of solids flow may be substituted as an approximation of the taper predicted from the correlation.

The particular improvement of the present invention involved resides in the restricted outlet of the conveyance conduit designed and operated as above indicated. A short restriction zone of between about 0.25 and 5.0 conveyance conduit diameters in length is provided at the discharge end of the conveyance conduit in which the cross-sectional area open to solids flow is decreased to a value between about 99% and 60% of the maximum cross-sectional area in the line. Such a restriction of the outlet decreases the cross-sectional area open to solids flow and simultaneously increases the velocity of the conveyance fluid and the conveyance force ratio to a value of from 1.1 to about 5.0, a value between about 1.5 and 3.0 being preferred. This increase is reflected in an opposing force acting in the opposite direction to solids flow and which serves to maintain the flowing solids in substantially compact form.

The granular solids flowing through the conveyance conduit under the influence of a conveyance force greater than 1.0 (from 1.01 to 3.0 and preferably between about 1.05 and 1.5) move into the restriction zone wherein an opposing force against the granular solids is encountered simultaneously with and generated by an increased conveyance force ratio. The granular solids will not stop moving but the presence of the restriction is such as to maintain the granular solids in compact form while in transit in the conveyance zone and yet an open orifice to the conveyance zone is permitted; that is, no transverse thrust plate is required.

The granular solids discharge into a restricted space termed a solids reversing zone in which the granular solids change direction and flow principally by gravity cocurrently with the depressured conveyance fluid. The depressured conveyance fluid and the transported solids are then withdrawn.

The principal advantage of this type of discharge outlet lies in the fact that the thrust force opposing discharge of granular solids exists in a line full of solids immediately upon initiating solids or conveyance fluid flow regardless of the presence or absence of granular solids in the reversing zone. Methods for restricting the discharge of compact solids from such a conveyance zone have heretofore been dependent upon the presence of such solids. In many cases these solids drain away from the outlet of the conveyance zone and subsequently startup of the conveyor is rendered more difficult due to the fact that the opposing thrust force must be re-established by filling the separator zone or flow reversing zone surrounding the discharge outlet.

The process and apparatus of the present invention will be more readily understood by reference to the accompanying drawings in which:

Figure 1 is an elevation view in partial cross-section of a conveyance apparatus employing the improved solids discharge device of the present invention, Figure 2 is a plan view in cross-section of the solids reversing zone which is used with a vertical conveyance conduit, and Figure 3 is a modification of the conduit discharge apparatus from which the conveyance fluid is also removed.

Referring now to Figure 1, the essential elements of the conveyance apparatus according to this invention include induction chamber 10, redirection or inlet zone 12, tapered conveyance conduit 14, restriction zone or conduit 16 included within the distance (a) from the outlet orifice 18 of conveyance zone 14, and reversing zone 20. The granular solids are introduced via line 22 controlled by means 24 into induction chamber 10. Element 24 may comprise a valve or an improved type of star feeder presently available adapted to the introduction of granular solids from a low pressure to a high pressure zone. The latter type of feeder is preferable since a continuous conveyance of granular solids is permitted. A conveyance fluid under pressure is introduced simultaneously via line 26 at a rate controlled by valve 28, which preferably is actuated by a flow or pressure recorder controller. The conveyance fluid depressures cocurrently with the granular solids through redirection zone 12 and conveyance zone 14 into reversing zone 20. The granular solids in the redirection and conveyance zones are maintained in substantially compact form while in motion due to an opposing force generated within the moving mass of solids during passage through discharge restriction zone 16. The depressured conveyance fluid flows cocurrently with the granular solids from reversing zone 20 through transfer line 30 into separator chamber 32. The separator chamber is provided with transverse tray 34 from which tubes 36 depend. Surrounding tubes 36 and beneath tray 34 is an open space free of solids forming fluid disengaging zone 38. Depressured conveyance fluid is removed therefrom via line 40 at a rate controlled by valve 42 and back pressure regulator 44. The conveyed solids are drawn from chamber 32 via line 46 at a rate controlled by element 48 which, like element 24, may comprise a valve or a pressure-tight improved type of star feeder.

Referring now to Figure 2, a plan view of reversing chamber 20 is shown in which conveyance conduit 14 is shown provided with restricted outlet 18. The preferred way of forming the restricted outlet is by flattening the discharge end of the conveyance conduit into a non-circular cross-section substantially as shown in Figure 2. An elliptical outlet is satisfactory, but any treatment of the discharge end of the conveyance conduit which gradually reduces its cross-sectional area to less than the maximum cross-sectional area of the conduit will perform the function of restricting the solids discharge rate and providing the opposing thrust force required to maintain the solids in compact form.

Referring to Figure 3, an elevation view in cross-section of a modified separator or conveyance zone is shown. Granular solids are injected as described via conveyance zone 50 through restriction zone 52 which, in this modification, comprises a nozzle whereby the cross-sectional area open to solids flow is reduced to perform the function described. The depressured conveyance fluid and granular solids reverse direction in reversing zone 54 and flow downwardly by gravity through tubes 56 dependent from transverse tray 58. A disengaging space 60 is thereby formed from which depressured conveyance fluid is removed via line 62 at a rate controlled by valve 64. The conveyed granular solids subsequently flow by gravity from the separator chamber 68 via line 70 at a rate controlled by element 72 which may be either a valve or a pressure-tight star feeder.

The following examples are illustrative of the construction and operation of the improved conveyance conduit according to the present invention.

*Example I*

A conveyance conduit 27.25 feet in length, disposed vertically, is provided with a uniform taper increasing from 3.068 inches inside diameter (I. D.) at its entrance to 4.00 inches I. D. maximum. Granular cracking catalyst is conveyed therethrough by means of compressed air depressuring from 12 lbs. per square inch gauge to substantially atmospheric pressure. The restriction zone comprises an elliptical outlet orifice of 4.125 inches major I. D. and 3.50 inches minor I. D. In the conveyance of 20,000 lbs. per hour of bead cracking catalyst a conveyance force ratio of 1.2 is maintained within the conveyance zone and a maximum conveyance force ratio of 1.46 is attained in the restriction zone.

*Example II*

In the operation of the conveyance conduit as described in Example I the granular solids flow through the conduit is stopped by depressuring the induction zone. The granular solids present in the separator chamber and in the reversing zone are allowed to drain away. Upon repressuring the induction chamber and the conveyance zone with conveyance fluid, smooth flow of substantially compact granular solids is initiated in the conveyance zone.

*Example III*

In the apparatus of Example I the elliptical restriction zone is replaced by a conical outlet in the form of a nozzle of 4.00 inches maximum and 3.75 inches minimum I. D. An adequate thrust force is obtained to maintain the flowing granular solids in compact form even during startup conditions when the separator chamber is drained and free of solids. The force ratio in the restriction is 1.53.

In the present specification the term "substantially compact form" is intended to indicate a mass of solids having an operating bulk density which is substantially the same as the vibrational static bulk density of the solids determined when at rest and in the absence of moving fluids. To determine whether or not the solids in a conveyance line or in any portion thereof are moving in substantially compact form, resort may be had to any one of the following methods, which involve determination of bulk densities directly, or differential pressures, or changes in differential pressures with changes in flow rate of the conveying fluid. The first method to be discussed involves direct measurement of bulk densities.

The usual determination of the bulk density of granular solids is made in a vessel of known volume by applying vibrational forces to a known mass of solid granules. It is indicated that the moving solids in the apparatus of this invention are in the form of a continuous porous mass having an operating bulk density which is substantially the same as this vibrational bulk density.

The granular solids are conveyed in this state by means of a conveyance fluid depressuring through the substantially compact moving mass of granular solids so that substantially no fluidization or aeration or expansion of the porous mass of solids occurs to change the bulk density of the moving mass from this value.

It is recognized that the bulk density of a mass of granular solids is not always constant, but varies with the geometry of the particle arrangement. For example, a given mass of uniform spherical granules will have the least bulk density when systematically packed with particle centers coinciding with the corners of a cube (cubic packing—pore volume 47.64% [1]) and the greatest bulk density (about 41.5% greater) when uniformly packed with particle centers coinciding with the apexes of a tetrahedron (rhombohedral packing—pore volume 25.95% [1]). The bulk density of solids during conveyance according to this invention is intermediate between the bulk densities of solids uniformly packed according to the foregoing systems and is apparently a random mixture of several packing geometries. Similar density variations occur in packings of non-uniform and irregular particles.

In the conveyance system of the present invention such differences in packing arrangement apparently exist but they rarely if ever cause the bulk density of the moving solids to decrease more than 20% of the at-rest vibrational packed value and usually the decrease does not exceed about 5% of this value.

To illustrate the magnitude of the solids bulk density variation the following data are given typical of an operation for conveying compact solids:

| | |
|---|---|
| Conduit height, feet | 27.25. |
| Conduit attitude | Vertical. |
| Conduit diameter, inches: | |
|     Inlet | 3.068. |
|     Outlet | 4.000. |
| Conveyance fluid | Air. |
| Solids mesh size | 4–10. |
| Solids flow rate, lb./hr | 4,500. |
| Solids vibrational bulk density lb./cu. ft | 46.7. |

[1] Micromeritics, J M Dalla Valle (1943), p. 105.

Upon depressuring the conveyance fluid from the bottom of the conduit while preventing further introduction of solids thereinto, it was noted that the solids level dropped only 0.25 feet from the solids outlet at the top of the 27.25 foot line, indicating an operating solids bulk density of 46.3 pounds per cubic foot during conveyance. This is approximately an 0.85% decrease from the static value and in most cases the decrease is less than 2%.

Thus the operational density of the flowing solids may be determined simply by depressuring the conveyance conduit from the inlet end so as to prevent continued introduction of solids from the induction chamber into the conduit proper and observing the change in position of the solids level at the conduit outlet as was done in obtaining the data above. The operating bulk density of the solids then may be calculated by multiplying the static vibrational bulk density determined as previously described, by the ratio of the volume of that portion of the conduit remaining full of solids to the total volume of the conduit.

If more convenient, or as a check determination, the operating bulk density may also be determined by depressuring the conduit as above, removing the granular solids from the entire conduit, weighing this material and dividing the weight by the volume of the conduit in question.

Another test for determining whether or not the flowing solids are in substantially compact form consists in observing the change in differential pressure over a selected length of the conveyance conduit effected by changing the rate of flow of the conveyance fluid. In fluidized or aerated solids suspensions and the conventional gas lift processes, increases in aeration or conveyance fluid flow decrease the density of the suspension being conveyed and correspondingly decreases this differential pressure while in the method of this invention increases in conveyance fluid flow rate through the compact solids increase the differential pressure markedly. This characteristic distinguishes the compact state of the granular solids flowing according to this invention from dense phase aerated suspensions of solids. For example, in a 140 foot long conduit carrying 500 tons per hour of compact granular cracking catalyst by means of compressed air, the pressure differential is 49.6 pounds per square inch. A 10% increase in the volume of air injected into the inlet of the conduit raises the differential pressure to 60 pounds per square inch. By comparison, a 140 foot conduit conveying 82,200 pounds per hour of 12–30 mesh adsorbent carbon as a dilute suspension in air the pressure differential is 1.12 pounds per square inch and a 10% increase in the air input decreases the pressure differential to 0.99 pound per square inch. Similarly, in aerated or so-called "fluidized" systems the pressure differential decreases with increase in gas velocity. Thus, it is seen that the magnitude of the pressure differential is on the order of 50 times greater in conveyance of compact solids than in dilute suspensions and in many cases is considerably greater. Furthermore, this pressure differential changes positively (increases) in the conveyance of substantially compact solids and negatively (decreases) in the conveyance of fluidized suspensions of solids with increases in conveyance fluid flow rate.

Still another test for "substantially compact form" involves measuring the pressure drop per unit length along the conduit and calculating the conveyance force ratio therein. This ratio is:

$$\frac{\left(\frac{dp}{dl}\right)}{\rho_s \cos \theta}$$

(the terms of which are given elsewhere herein). Except in relatively rare cases when the operating bulk density is decreased by an amount approaching 20% of the vibrational bulk density $\rho_s$, due to packing rearrangements of the compact solids and the ratio thus determined, may be as low as 0.8, the conveyance force ratio as thus calculated exceeds 1.0 for conveyance of substantially compact solids whereas in a conduit carrying an aerated suspension a very considerably lower value of $$\left(\frac{dp}{dl}\right)$$

and a conveyance force ratio well below 1.0 based on the vibrational bulk density is found. Both compact and aerated solids may exist in the same conduit and is a desirable operation in such processes as contact coking wherein the solids increase the size during operation. The increased solids attrition due to the aeration reduces this particle size and may be controlled to balance one effect against the other. In most other cases it is desirable to maintain the entire mass of solids in compact form for minimum energy requirement and solids attrition rate.

Thus in the present invention, the granular solids are conveyed in substantially compact form by means of a concurrently depressuring conveyance fluid, if the operating bulk density is not more than 20% less than the static vibrational bulk density, or if there is an increase in pressure differential with increase in fluid flow rate, or if the conveyance force ratio is greater than 1.0.

Each solid particle is continuously in direct contact with several other particles surrounding it and are not free to move relative to them differentiating those conveyance operations in which the solids are aerated, fluidized or otherwise suspended in a fluid and have operating bulk densities always considerably less than 80% of the vibrational or static bulk density.

The solids to inner conduit wall angle of repose $\alpha°$ is defined as the maximum inclination (with respect to a horizontal plane) of a conduit full of granular solids at which the granular solids will not flow therethrough by gravitational forces alone. Gravity flow of solids can occur only when a conduit has an inclination greater than $\alpha°$. In all other flow directions a conveyance force is required to cause motion. Such other flow directions pass through the apex of and are included in the solid angle formed from rotating about a vertical axis the $(90+\alpha)°$ angle struck downward from that axis. The process and apparatus of the present invention is primarily applicable to the conveyance of granular solids in directions included in the solid angle defined above, but it also is applicable though part of the conveyance path is along a direction outside this solid angle.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. An apparatus for the conveyance of granular solids which comprises an elongated conveyance conduit, means for merging the inlet to said conveyance conduit in compact unfluidized granular solids, means for introducing a conveyance fluid under pressure into the entrance of said conveyance conduit, said conveyance conduit being provided with an outlet opening of less cross-sectional area than the maximum cross-sectional area of said conveyance conduit and adapted to generate a counter thrust force acting against the discharge of solids therefrom thereby preventing solids fluidization and suspension formation and maintaining the solids therein in substantially compact unfluidized form.

2. An apparatus for conveyance of granular solids which comprises an elongated conveyance conduit, inlet means for a conveyance fluid under pressure and granular solids thereto, said inlet means adapted to submerge the inlet opening of said conveyance conduit with an unfluidized compact bed of granular solids to be conveyed, the outlet of said conduit being provided, adjacent its outlet opening with a short outlet section of conveyance conduit along which the cross-sectional area decreases in the direction of solids flow, thereby generating a thrust force against the solids discharge from said conveyance conduit whereby solids fluidization therein is prevented and said solids are conveyed in compact form.

3. An apparatus according to claim 2 wherein the outlet cross-sectional area is between 99% and 60% of the maximum cross-sectional area of the conveyance conduit.

4. An apparatus for the conveyance of granular solids which comprises an induction chamber communicating with an elongated conveyance conduit, separate inlet conduits opening into said chamber for granular solids in compact unfluidized form and adapted to submerge the inlet opening of said conveyance conduit therewith and for a conveyance fluid under pressure, a solids-fluid separator chamber communicating with the other end of said conveyance conduit and provided with means for removing therefrom conveyed solids and depressured conveyance fluid, the outlet of said conveyance conduit being provided with an outlet section of conveyance, conduit of decreasing cross-sectional area terminating in an opening of between 99% and 60% of the maximum cross-sectional area of said conveyance conduit whereby solids flow therethrough generates a thrust force against solids discharging therefrom thereby preventing solids fluidization and maintaining solids therein during conveyance in substantially compact unfluidized form.

5. An apparatus according to claim 4 in combination with a reversing chamber surrounding said outlet section of conveyance conduit and communicating via a transfer conduit with said separator chamber.

6. An apparatus according to claim 4 wherein said outlet section of conveyance conduit comprises a nozzle having an inlet cross-sectional area equal to the greatest area of the conveyance conduit and an outlet area equal to from 99% to 60% of that value.

7. An apparatus according to claim 4 wherein the length of said restriction conduit is between 0.25 and 5.0 times the maximum diameter of the conveyance conduit.

8. An apparatus according to claim 4 wherein said conveyance conduit is provided with a circular cross section and said outlet section of said conveyance conduit of reduced cross-sectional area comprises a flattened portion of the conduit at its discharge end forming an outlet opening of non-circular cross section.

9. An apparatus according to claim 4 wherein said means for removing depressured conveyance fluid from said solids-fluid separator chamber comprises a transverse tray disposed therein below the outlet opening of said conveyance conduit, at least one tube open at both ends depending from said tray and adapted to the downflow of solids therethrough forming a disengaging space around said tubes, and a valved conduit for fluid opening from said solids-fluid separator chamber below said tray and adjacent the dependent tubes.

10. An apparatus according to claim 4 in combination with means for controlling the rate of removal of conveyed solids from said solids-fluid separator chamber.

11. An apparatus for the conveyance of granular solids which comprises an elongated conveyance conduit provided with an outlet opening having a cross-sectional area between about 99% and about 60% of the maximum cross-sectional area of said conduit, means for submerging the inlet opening of said conduit with a bed of solids to be conveyed, a solids-receiving chamber adapted to support a bed of discharged solids at the reduced area outlet opening of said conduit whereby passage of solids therethrough into said solids-receiving chamber generates a thrust force against the solids from said conduit to maintain said solids during conveyance substantially at their static bulk density, means for introducing a conveyance fluid under pressure into the inlet of said conduit to convey said solids therethrough, and means for removing discharged solids and conveyance fluid from said solids-receiving chamber.

References Cited in the file of this patent

UNITED STATES PATENTS

| Number | Name | Date |
| --- | --- | --- |
| 788,741 | Trump | May 2, 1905 |
| 2,392,765 | Reeves | Jan. 8, 1946 |
| 2,541,077 | Leffer | Feb. 13, 1951 |

FOREIGN PATENTS

| Number | Country | Date |
| --- | --- | --- |
| 180,397 | Great Britain | May 11, 1922 |
| 268,667 | Great Britain | Apr. 7, 1927 |